US011451913B2

(12) United States Patent
Heineman

(10) Patent No.: US 11,451,913 B2
(45) Date of Patent: *Sep. 20, 2022

(54) DIGITAL AUDIO COMMUNICATION AND CONTROL IN A LIVE PERFORMANCE VENUE

(71) Applicant: En Technology Corporation, Keene, NH (US)

(72) Inventor: Fred W. Heineman, Sunapee, NH (US)

(73) Assignee: En Technology Corporation, Keene, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,990

(22) Filed: Mar. 23, 2021

(65) Prior Publication Data

US 2022/0046372 A1 Feb. 10, 2022

Related U.S. Application Data

(63) Continuation of application No. 16/581,729, filed on Sep. 24, 2019, now Pat. No. 10,966,039, which is a continuation of application No. 13/962,359, filed on Aug. 8, 2013, now Pat. No. 10,469,965, which is a continuation of application No. 12/759,889, filed on Apr. 14, 2010, now Pat. No. 8,532,311.

(60) Provisional application No. 61/169,020, filed on Apr. 14, 2009, provisional application No. 61/322,420, filed on Apr. 9, 2010.

(51) Int. Cl.

| | |
|---|---|
| ***H04B 3/00*** | (2006.01) |
| ***H04R 27/00*** | (2006.01) |
| ***H04H 60/04*** | (2008.01) |

(52) U.S. Cl.

CPC ............. *H04R 27/00* (2013.01); *H04H 60/04* (2013.01); *H04S 2400/13* (2013.01); *H04S 2400/15* (2013.01)

(58) Field of Classification Search

CPC ........ H04R 27/00; H04H 60/04; H04H 20/89; H04B 3/54

USPC ...................................... 381/77, 80, 82, 119

See application file for complete search history.

(56) References Cited

U.S. PATENT DOCUMENTS

| | | | |
|---|---|---|---|
| 5,596,647 | A | 1/1997 | Wakai et al. |
| 6,218,971 | B1 | 4/2001 | Sugihara et al. |

(Continued)

FOREIGN PATENT DOCUMENTS

| | | |
|---|---|---|
| WO | 2010120855 A1 | 10/2010 |

OTHER PUBLICATIONS

PCT/US10/30997 , "International Application No. PCT/US10/30997, International Preliminary Report on Patentability dated Oct. 27, 2011", 8 pages.

(Continued)

*Primary Examiner* — George C Monikang

(74) *Attorney, Agent, or Firm* — GTC Law Group PC & Affiliates

(57) ABSTRACT

In embodiments of the present invention improved capabilities are described for digitally transmitting audio that is converted from analog audio received from analog media pickup devices in a live performance venue by a stage box to a base unit over off-the-shelf twisted pair cable while sending pre-amplification control signals and power over the cable to the stage box. Audio for the performance venue is remotely managed from a virtual audio engineering mixing board that wirelessly communicates audio control commands to the stage box from a handheld computing device.

14 Claims, 12 Drawing Sheets

(56) References Cited

U.S. PATENT DOCUMENTS

| | | | |
|---|---|---|---|
| 7,458,855 B2 | 12/2008 | Khemakhem et al. |
| 8,532,311 B2 | 9/2013 | Heineman |
| 10,469,965 B2 | 11/2019 | Heineman |
| 10,966,039 B2 | 3/2021 | Heineman |
| 2002/0065650 A1 | 5/2002 | Christensson et al. |
| 2003/0035556 A1 | 2/2003 | Curtis et al. |
| 2004/0022399 A1 | 2/2004 | Combest et al. |
| 2004/0030425 A1 | 2/2004 | Yeakel et al. |
| 2005/0055116 A1 | 3/2005 | Isaka et al. |
| 2007/0211907 A1 | 9/2007 | Eo et al. |
| 2008/0091286 A1 | 4/2008 | Lengeling et al. |
| 2008/0188965 A1 | 8/2008 | Bruey |
| 2009/0055157 A1 | 2/2009 | Soffer |
| 2010/0290638 A1 | 11/2010 | Heineman |
| 2014/0037105 A1 | 2/2014 | Heineman |
| 2020/0053492 A1 | 2/2020 | Heineman |

OTHER PUBLICATIONS

PCT/US10/30997 , "International Application No. PCT/US10/30997, International Search Report and Written Opinion dated Sep. 13, 2010", 15 pages.

DIGITAL AUDIO COMMUNICATION AND CONTROL IN A LIVE PERFORMANCE VENUE

CROSS-REFERENCE TO RELATED APPLICATIONS

This application is a continuation of U.S. patent application Ser. No. 16/581,729, filed Sep. 24, 2019, and entitled "DIGITAL AUDIO COMMUNICATION AND CONTROL IN A LIVE PERFORMANCE VENUE". U.S. patent application Ser. No. 16/581,729 is a continuation of U.S. patent application Ser. No. 13/962,359, filed Aug. 8, 2013, and entitled "DIGITAL AUDIO COMMUNICATION AND CONTROL IN A LIVE PERFORMANCE VENUE", now issued on Nov. 5, 2019 as U.S. Pat. No. 10,469,965. U.S. patent application Ser. No. 13/962,359 is a continuation of U.S. patent application Ser. No. 12/759,889, filed Apr. 14, 2010, and entitled "DIGITAL AUDIO COMMUNICATION AND CONTROL IN A LIVE PERFORMANCE VENUE", now issued on Sep. 10, 2013 as U.S. Pat. No. 8,532,311. U.S. patent application Ser. No. 12/759,889 claims the benefit of U.S. Pat. App. No. 61/169,020, filed Apr. 14, 2009, and entitled "OMNISKNAKE", and U.S. Pat. App. No. 61/322,420, filed Apr. 9, 2010, and entitled "DIGITAL AUDIO COMMUNICATION AND CONTROL IN A LIVE PERFORMANCE VENUE". The content of each of the foregoing applications/patents is hereby incorporated by reference in its entirety.

BACKGROUND OF THE INVENTION

Field

The present invention relates to transmission of multimedia content over a connection and more specifically to improved methods and systems thereof.

Description of the Related Art

Conventionally, audio multi-cables may be used to transport audio from microphones at a stage, stadium or arena to an audio mixing console inside a mobile production trailer. These audio multi-cables are commonly referred to as "snakes" and are bulky. Moreover, these cables may be cumbersome to handle, prone to contact failure within the stage-box connector, and may require a lot of storage space when not in use. In addition, the ground loop imbalance or electromagnetic interference from lighting or other sources may generate a low frequency hum or sporadic noise in one or more of the audio signals.

Moreover, audio transported to an audio mixing console may then have to be transported back to the stage, stadium or arena to be output through one or more loudspeakers. The audio mixing console to loudspeaker connection traditionally requires a separate cable.

Moreover, microphones produce a very low-level analog electrical signal that must be transported a substantial distance to an audio mixing console where the signal may be amplified hundreds of times its original level. Any interference picked up along the way may be amplified resulting in degraded audio quality.

Converting an analog signal received from a microphone or other media pickup device to digital requires active electronics that must receive reliable power. Thus, when the conversion is performed by electronics in a stage box, a power connection may be required near the stage, stadium, or arena to provide power to the stage box. Alternatively, a power cable from the audio mixing console to the stage box may be required.

Even a directional microphone may pick up sound from other sources. In certain situations, when a number of microphones are positioned at various locations upon a stage, podium, arena, and the like, phasing problems may appear due to the difference in time that it takes sound to travel to each microphone. A digital signal processor may be required to alleviate these phasing problems.

In light of the above discussion, there may be a need of improved methods and systems to reduce the above stated undesirable sound effects and to combine audio signal transport with power delivery.

SUMMARY OF THE INVENTION

An Omnisnake apparatus and application may replace conventional audio/video performance capture and reproduction systems that include individual media transportation cables for each audio/video pickup device to a central base unit or mixing board. The Omnisnake apparatus and application may include enclosed custom or customized electronics, off-the-shelf cabling, and software running on off-the-shelf computing devices such as mobile computers. The customized electronics may include analog, digital, analog to digital, and digital to analog circuitry for providing audio/video capture, digital transmission over standard communication cables, and audio/video playback. In environments that require temporary setup of audio/video capture equipment for a live performance (e.g. a concert in the park), the Omnisnake apparatus and application substantially decreases the costs and complexity of such a temporary setup by allowing simplified cabling from a performance area (e.g. stage) to an audio control and management facility (e.g. a base unit, mixing board, etc.) and to loudspeakers. By combining high quality audio/video analog signal capture by a stage box that is disposed close to the performer's microphone with high speed digital transmission of audio/video/control signals among stage boxes (e.g. daisy chaining) and to base units or loudspeaker amplifiers, the quality of the audio pickup may be substantially improved while the size, cost, weight, and complications of cabling is significantly reduced.

The present invention may amplify microphone signals physically and electrically close to the source to reduce the opportunities for signal interferences to be amplified along with the microphone signals. In embodiments, the present invention may convert the resulting amplified analog audio signals to robust pulse-code modulated digital signals. The digital signals may be serialized to form individual data streams. In embodiments, the present invention may multiplex the individual data streams in time-domain to form a single main data stream. This may facilitate the use of an easier transport medium than bulky audio multi-cables. Further, the present invention may de-multiplex the main data stream into individual data streams for conversion back into the analog domain and/or into standard AES3 digital audio format. The present invention may isolate the ground potential between the audio mixing console and the microphone location by supplying the electrical power needed to energize the amplifier circuitry. In embodiments, the microphones may also be provided with electrical power to eliminate the main source of ground-loop interference.

In embodiments, the transport medium may be used to transport an audio signal in two directions, allowing the present invention to control both audio pickup devices and loudspeakers.

In embodiments, video from a video capture device may be converted to a digital stream and multiplexed into a single main data stream to facilitate the use of an easier transport medium.

The present invention may also include a portable computing device which may work in conjunction with or may replace conventional audio control panels, or mixing boards. The portable computing device may display a virtual mixing board for the user. The portable computing device may allow its user to manipulate audio settings wirelessly. Additionally, because the audio settings may be manipulated wirelessly, the sound engineer may move about the venue freely, not being tied to a traditional control panel at a fixed location, such as a mobile production trailer.

The methods and systems herein may comprise a means for capturing, transmitting, and reproducing audio and video signals.

In an aspect of the invention, methods and systems include taking an audio signal received at a stage box from an audio pickup device connected to the stage box, transmitting the audio signal in digital form from a stage box over a single cable to a base unit and powering the stage box over the same cable that is used to transmit the audio signal.

In the aspect, the stage box is located proximal to a live performance stage and the base unit is located distally from the stage box.

In the aspect, the stage box may receive a plurality of audio signals from a plurality of audio pickup devices and may multiplex the audio signals into one digital signal and transmit the multiplexed digital signal over a single cable to a base unit. The number of audio signals may be one of eight, sixteen, and thirty-two.

In the aspect, a digital processor located within the stage box may be used to process the audio in order to reduce signal interference. Further in the aspect, the base unit may process the audio transmitted in digital form to remove sounds picked up extraneously.

Further in the aspect, transmitting updated software over the cable to the stage box for updating software resident on the stage box.

In the aspect, a diagnostic facility operable on the stage box may be used to test transmitting audio in digital form from the stage box to the base unit.

In another aspect, methods and systems include daisy-chaining with a cable suitable for digital audio signal transmission a plurality of stage boxes and a base unit while powering each of the plurality of stage boxes from the base unit through the cable.

In the aspect, the cable is a twisted pair cable, a co-axial cable, or a tri-axial cable.

In the aspect, a pre-amplifier control setting may be transmitted from the base unit to at least one of the plurality of stage boxes over the daisy chain. Further in the aspect, the pre-amplifier control setting is a digital command for instructing a processor to control a pre-amplifier control feature of the stage box. The processor and the pre-amplifier control may be embodied within the stage box.

In another aspect, methods and systems include transmitting from a stage box to a base unit multiplexed digital audio signals generated from analog audio signals received by the stage box. The analog signals in the stage box may be pre-amplified. A portion of the multiplexed digital audio signals may be processed in the stage box to improve audio quality.

In the aspect, a cable connection may be used for transmitting from the stage box to the base unit. The cable connection may be one of a twisted-pair cable, a multiple twisted-pair cable, a co-axial cable, and a tri-axial cable. The stage box may be powered over the cable.

In another aspect, methods and systems include remotely controlling an analog audio pre-amplifier associated with an on-stage pickup device over a cable for facilitating transmission of a multiplexed digital audio signal between a base unit and a stage box containing the pre-amplifier. The cable may be one of a twisted pair cable, a co-axial cable, and a tri-axial cable.

In another aspect, methods and systems include managing audio in a performance venue with an audio control facility communicating with a stage box over a wireless network, wherein the stage box receives analog audio from at least one on-stage pick-up device. Further in the aspect, the stage box digitally controls at least one venue loudspeaker. In the aspect, the wireless network is one of a Wi-Fi network, Bluetooth network, and cellular network.

In another aspect, methods and systems include an audio control system for a performance venue comprising a plurality of digitally controllable audio pickup-device compatible stage boxes connected via a cable in a daisy chain and an audio control facility for communicating wirelessly with at least one of the stage boxes to manage audio signal transfer from at least one on-stage audio pickup device to at least one venue loudspeaker. The cable is one of a twisted pair cable, a co-axial cable, and a tri-axial cable. In the aspect, a portion of the plurality of stage boxes receives power via the daisy chain cable.

In another aspect, methods and systems include an audio control system for a performance venue comprising a plurality of stage boxes for receiving analog audio from a plurality of on-stage pickup devices, performing an analog pre-amp action on the received analog audio, and converting the analog audio to digital audio for communicating over a cable connecting the plurality of stage boxes in a daisy chain. The cable is one of a twisted-pair cable, co-axial cable, and tri-axial cable. In the aspect, a portion of the plurality of stage boxes receives power via the daisy chain cable.

In the aspect, an audio control facility embodied in a portable computing device may communicate with at least one of the stage boxes to provide pre-amplifier and venue loudspeaker control commands to each of the plurality of stage boxes over the daisy chain.

In another aspect, methods and systems include transmitting digital audio generated from analog audio by a first stage box over a cable connected to a second stage box for conversion by the second stage box to an analog signal to be output to a loudspeaker. The cable is one of a twisted-pair cable, co-axial cable, and tri-axial cable. Further in the aspect, at least one of the first and second stage boxes receives power via the cable.

In the aspect, a pre-amplifier control setting may be digitally transmitted over the cable from the second stage box to the first stage box for controlling a pre-amplifier associated with the analog audio.

In the aspect, a pre-amplifier control setting may be digitally transmitted over a wireless network from a remote audio control facility to the second stage box for controlling a pre-amplifier associated with the analog audio.

In another aspect, methods and systems include providing a stage box in communicating relationship with and receiving analog media signals from at least one media pickup device, digitizing the received analog media signals, multiplexing the digitized signals to produce a multiplexed digital media signal, connecting the stage box to a base unit via a cable, transmitting the multiplexed digital media signal from the stage box to the base unit over the cable, demultiplexing the transmitted signal with the base unit, and converting the demultiplexed signal to produce analog signals representative of the received media signals. Further in the aspect, the stage box may receive power from the base unit over the cable. The cable is one of a twisted-pair cable, co-axial cable, and tri-axial cable.

In the aspect, the media pickup device may be a video camera and the media signal may be a video signal.

In another aspect, methods and systems include a virtual audio mixing board interface operating on a processor that facilitates visualizing a representation of a performance venue including icons that represent media pickup devices, stage boxes, a base unit and digital audio cables making connections therebetween, and loudspeakers in real world orientation and representative spacing.

In the aspect, the virtual audio mixing board interface may contain icons for controlling a pre-amplification facility associated with a media pickup device, wherein the pre-amplification facility is associated with one of the stage boxes.

In another aspect of the invention, methods and systems include a stage box receiving a video signal from a video pickup device, and transmitting the video signal, in digital form, via a single cable to a base unit while power for the stage box is provided over the same cable.

In the aspect, the stage box is located proximal to a live performance stage and the base unit is located distally from the stage box.

In the aspect, the stage box may receive a plurality of video signals from a plurality of video pickup devices and may multiplex the video signals into one digital signal and transmit the multiplexed digital signal over a single cable to a base unit.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION OF THE PREFERRED EMBODIMENT(S)

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or as more than one. The term "another," as used herein, is defined as at least a second or more. The terms "including" and/or "having" as used herein, are defined as comprising (i.e., open transition). The term "coupled" or "operatively coupled," as used herein, is defined as connected, although not necessarily directly and not necessarily mechanically.

Figure 1:
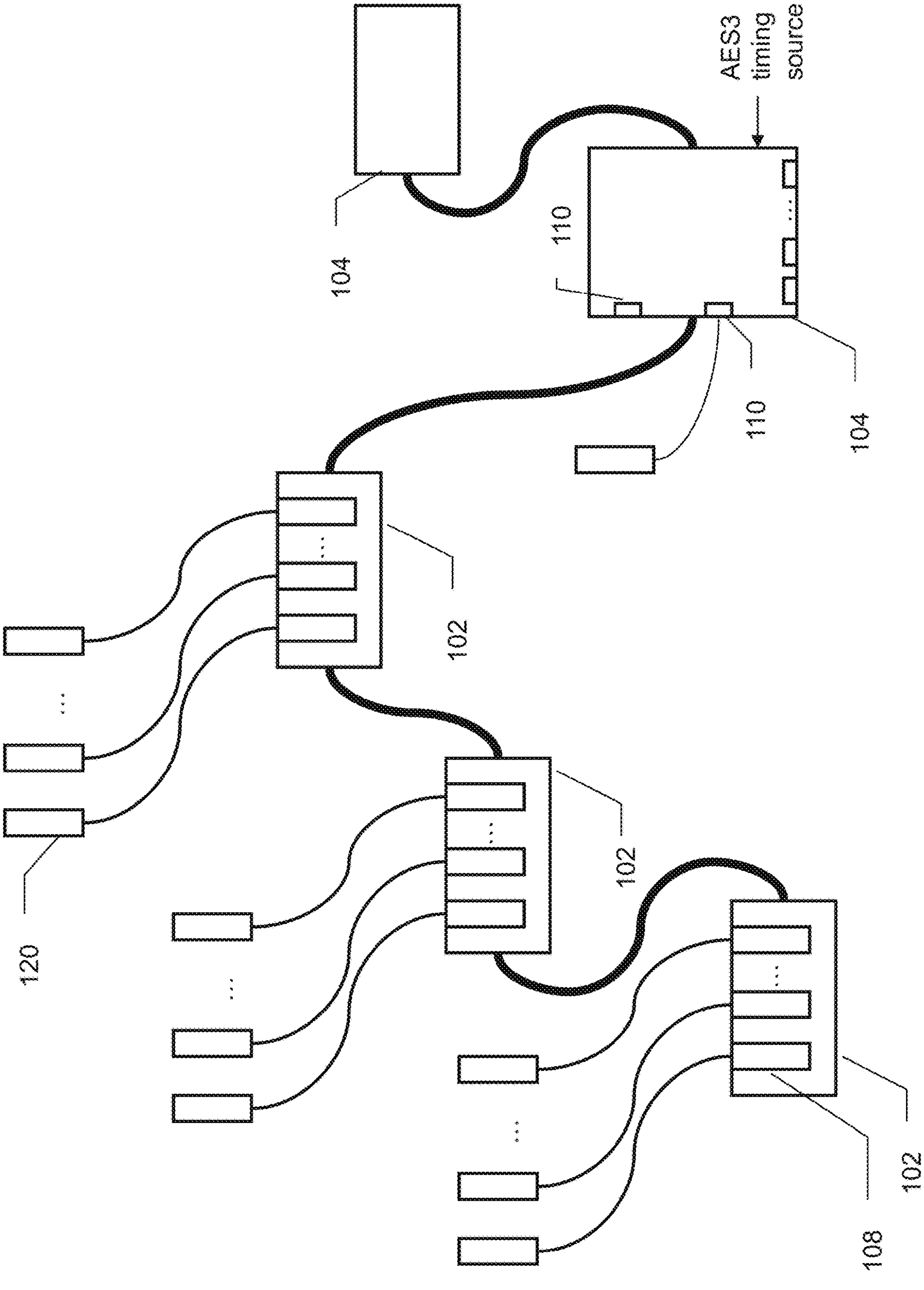
FIG. 1 depicts a plurality of audio pickup devices connected to a plurality of stage boxes which are connected to a plurality of base units in accordance with an embodiment of the invention.

Referring to FIG. 1, the present invention may include a stage box 102 and a base unit 104. The stage box 102 may be placed near a stage, an announcement booth, football field, tennis court, a live performance, and the like where audio or video may be produced. An audio pickup device, such as a microphone 120, a musical instrument, a CD player, a tape deck, and the like may be connected to stage box 102 and may produce an audio signal. The stage box 102 may digitize an audio signal, producing a digital data stream. The stage box 102 may multiplex a plurality of digital data streams resulting from digitizing a plurality of audio signals into a main data stream. The stage box 102 may transport the main digital data stream to a remote location using a cable or wireless connection.

The stage box 102 may convert a plurality of audio signals into individual digital data streams and multiplex the data streams into one main data stream. The stage box 102 may transport the main data stream to a remote location, such as another stage box, a base unit 104, a wireless network controller 208, a portable computing device 206, and the like. The stage box 102 may use a single cable connection to connect to the remote location. The cable connection may be a co-axial cable, tri-axial cable, or twisted-pair cable connection. The twister-pair may be shielded or unshielded, such as a CAT5 cable, CAT5e cable, CAT6 cable, and the like. The main data stream may be transported over one or more twisted-pairs in a cable such as a CAT5, CAT5e, or the like. In embodiments, the main data stream from a first stage box 102 may be transported over one set of the twisted-pairs, and a main data stream from a second stage box 102 may be transported over another set of the twisted-pairs in a given cable assembly. Any number of twisted-pairs may be utilized within a cable assembly for digital signals, analog signals, and the like for communicating between and among stage boxes, base boxes, audio pickup digitizing devices, and the like. For example, the co-axial cable may connect the stage box 102 to the front of house audio console or remote production truck. In an embodiment, the wireless connection may be one of Wi-Fi, RF, cellular, Bluetooth, and the like.

In embodiments, the stage box 102 may digitize a number of audio signals and then multiplex them into a single data stream, which may be sent over a single cable that may connect with the base unit 104. The number of audio signals may be one of four, eight, sixteen, thirty-two, and the like. Each of the audio signals may be either a microphone 120 level, line level, or other audio pickup device that may use a different connector type to connect to the stage box 102. The stage box 102 may provide a combination connector, such as an XLR/TRS connector (e.g. NUETRIK) that may accept a plurality of different connectors for microphone inputs, line level inputs, and the like.

In an exemplary scenario, an audio pickup device connected to the stage box 102 may have a variety of output levels. An audio pickup device with a line level output may have a consistent output level, while a microphone 120 may have a variable output level. A microphone output level may be from 20 dB to 60 dB below line level output. The stage box 102 may incorporate a pre-amplifier 108 that may increase the gain of the output level of a microphone 120 so that it is substantially similar to the output level of a line level audio pickup device. The pre-amplifier 108 may have a variable gain range to accommodate a variety of microphone 120. An appropriate gain, as well as other pre-amplifier control settings, may be remotely selected from a base unit 104, a virtual mixing board on a portable computing device 206, a digital control panel, an analog control panel, and the like.

In embodiments, the microphone 120 may be one of Dynamic Microphone, Ribbon Microphone, Condenser Microphone, Wired Microphone, Handheld Wireless Microphone, Hands free Wireless Microphone, and the like.

An audio pickup device may require a power source to function properly. For example, a microphone 120 may require a DC power source of 48 volts. The power source may be phantomed onto a microphone cable, creating a phantom power source. The stage box 102 may provide a phantom power source to an audio pickup device. The stage box 102 may provide a switch that turns on the phantom power source. The stage box 102 may provide an indicator light, such as an LED that may indicate that phantom power is being supplied to an audio pickup device. The stage box 102 may group audio pickup devices that need to be supplied with power into a bank of audio pickup devices and may supply power to an entire bank of audio pickup devices.

A stage box 102 may have one or more connectors for connecting to a base unit or other stage boxes. In an example a stage box 102 may have a primary and secondary RJ45. A stage box 102 that may be connected to a base unit 104 through the primary RJ45 may also be connected to another stage box 102 through the secondary RJ45. Such a configuration may have the first stage box 102 acting as a base unit for the second stage box 102 from which it would receive a multiplexed main data stream. The first stage box 102 may integrate its own audio pickup device inputs with the multiplexed main data stream it receives from the second stage box 102. Thus, the base unit 104 may receive a single multiplexed data stream containing audio signals from audio pickup devices connected to both the first stage box 102 and the second stage box 102. In another example, a first base unit 104 may be connected to a second base unit 104. The first base unit 104 may de-multiplex the main data stream received from the first stage box 102 and may pass on the audio signals representing the audio pickup devices connected to second stage box 102 to the second base unit 104. Alternatively, the first base unit 104 may process all the audio signals received, or may pass along all the audio signals received to the second base unit 104.

The base unit 104 may de-multiplex the main data stream into individual data streams, and may convert these data streams back to analog audio signals as well as to AES3 digital audio formatted channels.

In embodiments, the base unit 104 may receive a multiplexed main data stream from the stage box 102 through a cable connection. The base unit 104 may de-multiplex the main data stream into separate individual digital audio streams and may convert the digital audio stream to analog audio signals. The base unit 104 may convert the digital audio stream received into a common format, such as AES3 digital format. In addition, the base unit 104 may also send a pre-amplifier control setting, such as gain, a timing reference, frequency, phasing, and the like to a stage unit 102 utilizing the same cable connection. To synchronize the digital audio outputs to an external source, the base unit 104 may receive an AES3 digital audio input as a timing reference. Another type of signal containing synchronizing information, such as analog video or Serial Digital Video, or AES3 word clock may alternatively be used as a timing reference. The base unit 104 may adjust a master clock to this reference and may send a timing reference to the stage box 102.

The base unit 104 may serve as a power source for the stage box 102 by sending power, such as DC voltage and the like along the same cable connection used to receive the digital audio stream to power the stage box 102. The power may be a mixture of switching regulators and linear regulators. The power may be sent down the cable by filtering, i.e., by separating DC from digital A/C signal. In an embodiment, when twisted pair or the like are utilized for connection, power over Ethernet (POE) technology may be used to send power.

In embodiments, the pre-amplifier 108 located within the stage box 102 may be controlled remotely from the base unit 104 via a return data channel on the cable connection. The base unit 104 may send a pre-amplifier control setting to control the pre-amplifier 108 within a stage box 102. A pre-amplifier control setting may be one of a gain setting, volume, synchronization information, phasing information, frequency information, power supply voltage, and the like and may be sent from base unit 104 to stage box 102. The synchronization information may be locked to an external timing reference.

In embodiments, the present invention may also provide a return audio signal whereby the base unit 104 has an analog audio input 110. The audio input 110 may produce an audio signal that may be digitized and a plurality of analog audio signals may be digitized and multiplexed into the same return data stream that provides pre-amplifier control settings to the stage box 102. The number of analog audio input 110 may be one of two, four, eight, and the like. The stage box 102 may then de-multiplex the return data stream and convert it back to analog audio signals.

In an embodiment, a base unit 104 may supply power to a stage box 102 using the same cable connection used by stage box 102 to send the main data stream to base unit 104. This arrangement may eliminate the need for a separate power source near the stage box 102 and may make the stage box 102 more portable.

In embodiments, the present invention may provide smart power to prevent damage to equipment that might be inadvertently connected to the cable attached to the base unit 104. A power monitor facility in the base unit 104 may supervise the application of DC power on the cable by checking for a signature resistance, such as approximately 25,000 Ohms. The power monitor facility may interrupt power delivery if no resistance is present, or if the resistance present is not the signature resistance. Conversely, if the power monitor facility does see the correct signature resistance provided by a properly connected stage box 102, it may perform a power-up sequence and send power, such as 48 volts DC to the stage box 102 via the cable. The power monitoring facility may provide over-current protection and may discontinue power delivery if stage box 102 draws more power than is anticipated. When the stage box 102 is disconnected, the power monitoring facility may discontinue the power supply.

In embodiments, the stage box 102 may only require a single cable for operation and connection to a base unit 104, another stage box 102, and the like. The stage box 102 may be compact. For example, the stage box 102 may be a 4×1 version and multiple stage boxes 102 may be connected to form 16×4 versions. In embodiments, several of these compact stage boxes 102 may be daisy-chained together by the cable. Each stage box 102 may have the ability to multiplex its own digitized audio streams with those received from another stage box 102 further down the chain. Thus, the audio streams from a plurality of stage boxes 102 may be combined into a single main data stream to be sent to a base unit 104.

In embodiments, the present invention may provide a 2×2 plus video Stage box 102/Base unit 104. This unit may operate only over twisted pair cable and may be used with the 16×4 base unit 104 and may be daisy chained with other Stage boxes 102 in a manner similar to the 4×1 version. This unit may have the ability to serve either as a stage box 102 or base unit 104, so that two 2×2 plus video stage box 102/base unit 104*s* may be connected via a single twisted pair cable to provide a complete stand-alone 2×2 audio plus video system. The unit, which may be connected to an external DC power, may become the video source unit, and the other unit may become the video destination.

In an example, one twisted pair of a cable may carry one analog video channel in either direction. This may facilitate simplicity and cost control as well as facilitate longer overall length of a twisted-pair cable. Alternatively, the video may be digitized and sent over a twisted pair cable or other transport medium such as wireless connection. Alternatively, the digitized video may be multiplexed within the main data stream that also carries the digitized audio channels.

In embodiments, the stage box 102 may comprise sixteen audio pickup devices. Likewise, four return audio pickup devices may be utilized by the base unit 104 for a purpose such as a stage monitor. The stage box 102 may use a cable connection to connect to the base unit 104. The cable connection may be one of co-axial cable, tri-axial cable, CAT5 cable, CAT6 cable, and the like.

In embodiments, a second stage box 102 may be used in place of a base unit 104. It is understood by those skilled in the art that a stage box 102 may provide any or all of the functionality provided by a base unit 104 without changing the scope of this invention.

In embodiments, the present invention may daisy-chain a plurality of stage box 102 or base unit 104. For example, one cable may connect two base units 104 with two stage boxes 102. It is understood by those skilled in the art, that a different type of cable may be used to connect different components of the present invention. For example, a first stage box 102 may be connected to second stage box 102 using a twisted-pair cable, while the second stage box 102 may connected to a base unit 104 by a co-axial cable. The use of different cable types for different connections may allow for flexibility in installation, reduction in cost, and ease of maintenance. For example, the twisted-pair cable, which may be easy to run through conduits, may be used in a church instead of installing the multi-cable audio snake.

The present invention may allow for more flexibility and easier changes to the configuration of audio/visual equipment. For example, when a facility is used for different types of functions, it may be useful to locate a compact stage box 102 at various locations to account for varying audio and visual setups. The stage box 102 may be placed in the floor of a stage, within a floor box, and in other similar locations. In another example, cable connections, such as twisted-pair connections, can be made at various locations within the facility, allowing the stage box 102 to be moved to the necessary location and connected as needed, depending on setup requirements.

In embodiments, the stage box 102 and the base unit 104 may be logically programmed. An analog to digital (A2D) converter and a digital to analog (D2A) converter may be installed in stage box 102 and base unit 104. Channels of audio and one video may be digitized. By converting an analog stream to a digital stream for transport, these converters may avoid or reduce ground loop interference, RF interference, interference from lighting systems, and the like. Once in the digital format, the audio and video signal may be immune to various kind of interference.

In embodiments, the present invention may also provide a maestro audio A2D converter device. This device may accept either balanced or unbalanced stereo analog signals from audio pickup devices and may convert them into a single digital audio stream that complies with the AES/EBU (AES3) and S/PDIF digital audio standards. The device may use 128 times oversampling for extremely accurate and linear analog to digital conversion, and may offer a high dynamic range with exceptionally low total harmonic distortion and noise. This, along with the 128 times oversampling, may help to move any noise associated with the digital conversion well outside the audible spectrum. In embodiments, a display such as two LED bar graphs, a monitoring screen, and the like may indicate the analog audio input levels to assure proper setup and operation. Internal switch settings may provide a selection of the three most common professional digital audio frame rates of 48 kHz, 44.1 kHz, and 32 kHz. The digital audio output may be provided on three connector types and formats: XLR for 110 ohm balanced cable, BNC for 75 ohm unbalanced co-axial cable and TOSLINK for optical cable.

In embodiments, the present invention may also provide a maestro audio digital to analog converter device. This device may receive an AES/EBU (AES3) or S/PDIF digital audio and may convert it to two channels of analog audio. It may automatically detect sample rates up to 96 kHz with low-jitter clock recovery. Three connector types and formats may be provided for the digital audio input: XLR for 110 ohm balanced cable, BNC for 75 ohm unbalanced co-axial cable and TOSLINK for optical cable. Front panel LEDs may indicate the detected frame rate for the three most common audio rates of 32 kHz, 44.1 kHz, and 48 kHz. In addition, front panel LEDs may indicate when the unit is properly locked to the digital audio input stream. This device may employ high-precision 24-bit conversion, oversampling, and filtering techniques, to deliver120 dB of dynamic range and −100 dB total harmonic distortion and noise.

In an embodiment, two balanced line-level audio outputs may be provided on XLR connectors as well as on a stereo headphone mini-jack for monitoring.

In embodiments, the present invention may also provide a maestro video analog to digital converter device. This device may accept either NTSC or PAL composite analog video or component S-Video and convert it to a SMPTE 259C 270 MHz Serial Digital Interface (SDI) with full 10-bit precision. It may include automatic detection of NTSC 525-line and PAL 625-line standards, four SDI outputs, VBI Data processing, a rugged self-contained metal enclosure and various mounting options from desktop, to rear side-rail rack mounting, to ganged front-side or rear-side rack mounting.

In embodiments, the present invention may also provide maestro video digital to analog converter maestro device. This device may receive a SMPTE 259C 270 MHz Serial Digital Interface (SDI) video stream and may convert it to NTSC/PAL composite analog video and component S-Video outputs. It may feature full 10-bit digital-to-analog conversion, four NTSC/PAL composite analog video outputs and one S-Video output, a rugged self-contained metal enclosure and various mounting options from desktop, to rear side-rail rack mounting, to ganged front-side or rear-side rack mounting.

In embodiments, the firmware or software installed on stage box 102 and base unit 104 may be upgradeable. The firmware or software upgrade may provide enhanced functionality, as well as new functionality. A firmware or software upgrade may be performed by connecting a computer, a flash drive, or the like to a connector within the stage box 102 or base unit 104. Alternatively, an electronics board, such as a FLASH memory board, may be removed from the chassis and plugged in to an upgrade connector. A wireless upgrade may be performed using the wireless interface 230 described in FIG. 2. If a connector is used, it may be any type of connector and may include a mini-connector accessible on the exterior of the box. In embodiments, specialized software may be downloaded over the Internet. In an example, upgraded firmware may go from a network, such as the Internet over the cable from the base unit 104 to the stage box 102.

In embodiments, firmware or software installed on stage box 102 or base unit 104 may comprise a diagnostic mode. The diagnostic mode may allow a technician or other user to perform diagnostics, maintenance, upgrades, and the like remotely. Thus, the maintenance and support cost may be lowered.

In embodiments, the stage box 102 may provide a test signal that may be used to configure and align an entire sound system (e.g. by using a handheld testing device, or the like). The digital audio may have a limit or maximum signal level to avoid flattening or distortion. For example, an analog amplifier driving home speakers may drive to the point where physical characteristics of system may flatten the top end of the system response to the input analog signal. In embodiments, there may be no limit in analog signals. The limit may depend on intermediate circuitry, such as speakers, and the like. The present invention may set up the entire digital signal transmission chain to make sure nothing distorts the input audio or video signal.

In embodiments, the present invention may provide an AES/EBU genie pocket test signal generator system. This hand-held system may generate the entire test signals needed for installing, evaluating and diagnosing digital audio equipment and systems. The system may be battery powered, which may include a belt clip and internal battery charger, as well as an AC adapter for bench-top operation. An optional belt clip and a BNC-to-XLR balun adapter may be provided for added convenience and flexibility.

In embodiments, the present invention may also provide an AES/EBU wizard pocket audio monitor system. This hand-held system may receive digital audio at any sampling rate from 32 kHz to 96 kHz, and may display the received sampling rate, lock status, and five different error conditions. It may also have a headphone jack and volume control for monitoring digital audio sources; like the AES/EBU genie pocket test signal generator system, it may be battery powered and may include an internal battery charger as well as an AC adapter for bench-top operation. An optional belt clip and a BNC-to-XLR balun adapter may be available for added convenience and flexibility.

In an embodiment, the stage box 102 may comprise a digital signal processor that may alter the delay or frequency response of an audio pickup device connected to stage box 102 to compensate for phasing problems that may arise from the use of multiple audio pickup devices of varying type. The present invention may use a software program to vary the delay or phasing of individual audio pickup devices. This may eliminate the need for a sound board. For example, by running an application like GarageBand or a movie production application directly from a computer connected to a stage box 102 may eliminate a need for a base unit 104 or a sound board. Alternatively, a base unit 104 may be adapted to facilitate interfacing the stage box 102 with a computer. The computer could be dedicated, such as a desktop computer, or could be portable such as a laptop computer, a portable computing device, a phone, a digital audio player, a PDA, and the like. Communication among the computer, base unit and stage box may be wireless. In another example, software built into a base unit 104 may be used to control the digital signal processor. A computer may be connected directly to a stage box 102, eliminating the need for a base unit 104.

The stage box 102 may be compact in size, capable of being used in a portable, stand-alone system. The stage box

102 may have removable tabs allowing for mounting on a wall, floor, ceiling, panel, and the like. The base unit 104 may be compact in size, and may allow for a combination of two or more base units 104 to form an expanded base unit which may be rack mounted. The stage box 102 and the base unit 104 may be a rugged self-contained metal enclosure that may have a number of mounting options such as desktop, rear or side-rail rack mounted, ganged front-side or rear-side rack mounted, and the like. This multitude of possible configurations may permit the stage box 102 or base unit 104 to be located as close as possible to the audio source equipment. The stage box 102 and/or the base unit 104 may be configured in a portable enclosure suitable for indoor use, outdoor use, and the like.

In embodiments, the present invention may also provide an express data broadcast system. The system may include an encoder unit and a receiver/decoder unit. The encoder unit may be a VDI 2000S Encoder. The data encoder unit may insert VBI data into an NTSC or PAL composite analog video or component S-Video signal at data rates from 4800 Baud to 115,200 Baud. The data encoder unit may connect directly to a serial port and may be compatible with both RS-232 and RS-422. The receiver unit may be a TVM 2000ST. This portable data receiver may encode all standard VBI data formats at data rates from 4800 Baud to 115,200 Baud. The receiver unit may be a rack mountable or stand-alone and may feature a rugged enclosure for portable environments.

Figure 2:
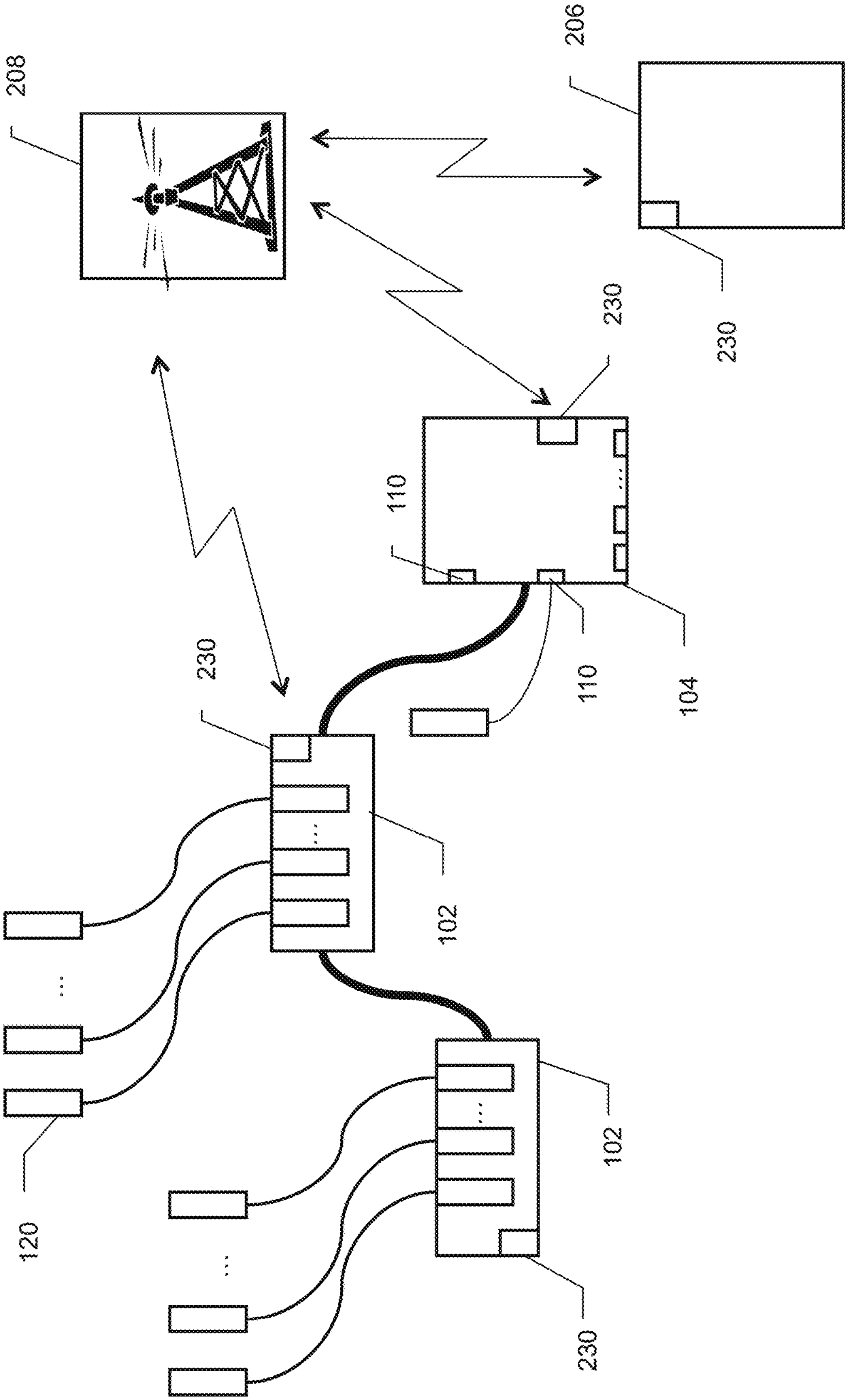
FIG. 2 depicts a portable computing device in use with daisy-chained stage boxes, a base unit and a wireless network controller in accordance with an embodiment of the invention.

Referring to FIG. 2, the present invention may include a portable computing device 206, a wireless network controller 208, a stage box 102, and a base unit 104. The stage box 102, base unit 104, and portable computing device 206 may each contain a wireless interface 230. The wireless interface 230 may allow the stage box 102, the base unit 104, and the portable computing device 206 to wirelessly transport data to the wireless network controller 208. The wireless transport may utilize a known network protocol or may utilize a proprietary network protocol for transmission and reception.

In an embodiment, the stage box 102 or the base unit 104 may transport digitized audio and video signals to wireless network controller 208. The wireless network controller 208 may transport the digitized audio and video signals to a portable computing device 206. The portable computing device 206 may display a graphical representation of the audio information on its screen. The portable computing device 206 may allow a user to listen to the audio or view the video signal transported by the wireless network controller 208. The portable computing device 206 may alert a user to the presence of certain conditions, such as incorrect voltage supplied, overload, and the like.

In an embodiment, the stage box 102 or the base unit 104 may transport digitized audio and video signals to a portable computing device 206 utilizing an ad-hoc network. Thus, a wireless network controller 208 may not be necessary for stage box 102 to communicate with base unit 104 or with portable computing device 206.

In an embodiment, the portable computing device 206 may be used to manipulate a setting of stage box 102 and base unit 104, such as the number of available inputs, the pre-amplifier control, and the like. The portable computing device 206 may be used to manipulate a pre-amplifier control setting, such as gain, volume, phasing, synchronization, power supply voltage, and the like. The portable computing device 206 may use wireless interface 230 to transport a pre-amplifier control setting to the wireless network controller 208 and then to stage box 102 or base box 104. A pre-amplifier control setting transported by a portable computing device 206 to a base unit 104 may be further transported wirelessly to a stage box 102. A pre-amplifier control setting transported by a portable computing device 206 to a base unit 104 may be further transported over a cable to stage box 102.

In embodiments, the present invention may support WIFI for digitized multimedia transportation and RF signal for power delivery. The power from a beam of an electromagnetic field may be transported. In an embodiment, the present invention may be implemented over a broadcast television signal. The present invention may control the stage box 102 over a broadcast signal.

Figure 3:
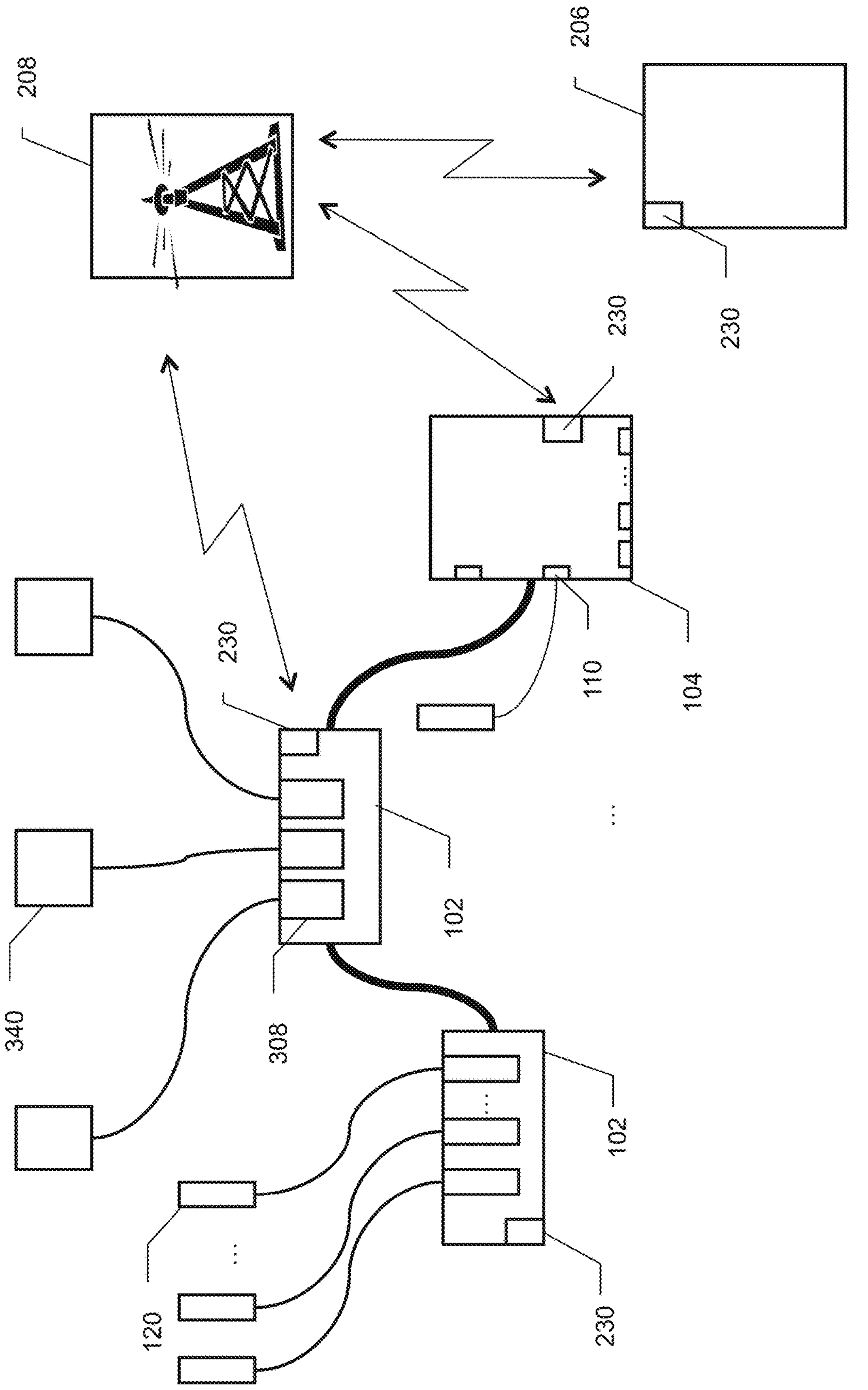
FIG. 3 depicts a plurality of audio pickup devices connected to a stage box which is connected to another stage box that controls a plurality of loudspeakers while the daisy-chained stage boxes are connected to a base unit in an embodiment of the invention.

Referring to FIG. 3, the stage box 102 may comprise a loudspeaker port 308. A loudspeaker 340 may be connected to a loudspeaker control 308. In embodiments, an audio signal from an audio pickup device may be received by a stage box 102. The stage box 102 may convert the analog signal to a digital stream, multiplex multiple digital streams into a main digital stream and send the resultant stream to a base unit 104. The base unit 104 may allow a user to manipulate a pre-amplification control setting for an audio signal. The base unit 104 may also send an audio signal to a loudspeaker 340 connected to a loudspeaker port 308 within a stage box 102.

In an embodiment, the stage box 102 may comprise both an input for an audio pickup device and a loudspeaker port 308. The stage box 102 may send the audio signal produced by an audio pickup device to a loudspeaker 340 connected to one of the loudspeaker ports 308 within the stage box 102.

In an embodiment, a stage box 102 may send an audio signal to a loudspeaker 340 connected to another stage box 102 using the cable connecting the two stage boxes. In another embodiment, a base unit 104 may send an audio signal to a loudspeaker 340 connected to a stage box 102 using the cable connecting the base unit 104 to the stage box 102.

Figure 4:
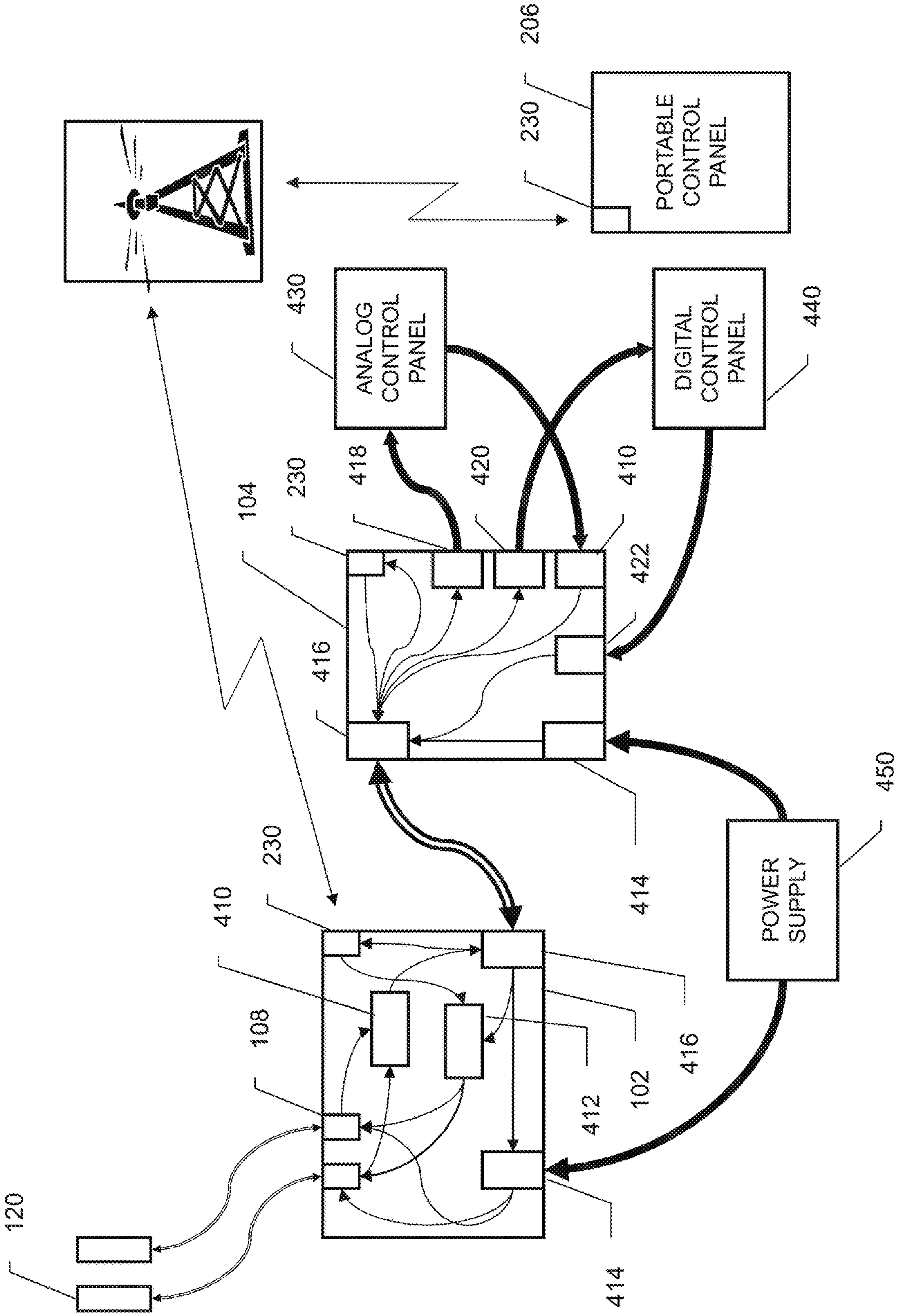
FIG. 4 depicts the internal communication between a stage box, a base unit, and various control panels in accordance with an embodiment of the invention.

The communication between a stage box 102 and base unit 104 is further described in FIG. 4. An audio pickup device, such as a microphone 120, may produce an analog audio signal handled by pre-amplifier 108 located within stage box 102. The pre-amplifier may send the analog audio signal to an analog to digital (A2D) converter 410. The A2D converter 410 may convert the analog audio signal to a digital audio stream. The A2D converter 410 may send the digital audio stream to a multiplexer 416. The multiplexer 416 may combine a plurality of digital audio streams into a single main digital stream. Additionally, the multiplexer 416 may combine power and pre-amplifier control setting data for transmittal to one of a base box 104, a stage box 102, a wireless network controller 208, a portable computing device 206, and the like. In an embodiment of the invention, the multiplexer 416 may transport the multiplexed data stream over a cable connecting the stage box 102 to another device, such as those listed above.

In another embodiment of the invention, the multiplexer 416 may send the multiplexed data stream to a wireless interface 230. Further in the embodiment, the wireless interface 230 may transport the multiplexed data stream to the wireless network controller 208.

A base unit 104 may receive a multiplexed main data stream via a cable connecting the base unit 104 to a stage box 102. A base unit 104 may also receive a multiplexed data stream via a wireless interface 230 which is wirelessly connected to a wireless network controller 208. When a base unit 104 receives a multiplexed main data stream from a stage box 102, a multiplexer 416 may be used to de-multiplex the main data stream into individual data streams.

In an embodiment, the multiplexer 416 may send a data stream to digital to analog (D2A) converter 418. The D2A converter 418 may convert the digital stream to an analog stream. The D2A converter 418 may transport the analog stream to an analog control panel 430 via a cable connection.

In another embodiment, the multiplexer 416 may send a data stream to a digital output 420. The digital output 420 may transport the digital stream to a digital control panel 440 via a cable connection.

In another embodiment, the multiplexer 416 may send a data stream to a wireless interface 230. The wireless interface 230 may transport the data stream to a wireless network controller 208 via a wireless connection. The wireless network controller 208 may transport the data stream to a portable computing device 206 via a wireless connection.

A stage box 102 and a base unit 104 may require power to function properly. In an embodiment, an audio pickup device, such as a microphone 120, may also require power to function properly. An external power supply 450 may supply power to a base unit 104, through a power supply converter 414 located within the base unit 104. External power supply 450 may be an alternating-current (AC) power supply. In another embodiment, external power supply 450 may be a direct-current (DC) power supply. The power supply converter 414 may provide the power required by base unit 104. The power supply converter 414 may convert the voltage supplied by power supply 450 from AC to DC or vice-versa. The power supply converter 414 may also alter the amperage of the power supplied as necessary. The power supply converter 414 may send power sufficient to run a stage box 102 and an audio pickup device connected to it to multiplexer 416. The multiplexer 416 may combine the power supplied by power supply converter 414 with a data stream. The multiplexer 416 may transport the power, combined with the data stream, to a stage box 102.

A multiplexer 416 within a stage box 102 may receive power, combined with a data stream, from a base unit 104. The multiplexer 416 may separate the power from the data stream and may send the power to power supply converter 414. In another embodiment, the external power supply 450 may send power directly to a stage box 102 and its power supply converter 414.

The power supply converter 414 within stage box 102 may provide the power needed by stage box 102 to function properly. The power supply converter 414 may provide power to match the power requirements of an audio pickup device connected to a pre-amplifier 108. The power supply converter 414 may send power to a pre-amplifier 108, which may send the power to an audio pickup device connected to it.

The user may configure a pre-amplifier control setting, such as gain, volume, phasing, synchronization, power supply voltage, and the like by using a control panel. An analog control panel 430 may send a pre-amplifier control setting to the base unit 104. An analog to digital (A2D) converter 410 may convert the received analog pre-amplifier control setting into digital pre-amplifier control setting. The A2D converter may send the digital pre-amplifier control setting to multiplexer 416.

In another embodiment, a digital control panel 440 may send digital pre-amplifier control setting to a base unit 104 through a digital input 322. The digital input 322 may send the digital pre-amplifier control setting to the multiplexer 416.

In another embodiment, a portable computing device 206 may send digital pre-amplifier control setting to a base unit 104. The base unit 104 may use a wireless interface 230 to receive a pre-amplifier control setting. The wireless interface 230 may send the digital pre-amplifier control setting to multiplexer 416.

The multiplexer 416 may combine the digital pre-amplifier control setting with the power supplied by power supply converter 414 and the digital audio stream and send the combined stream to a stage box 102 through a cable connection.

A stage box 102 may receive digital pre-amplifier control setting combined with a digital audio stream and power. In another embodiment, the stage box 102 may receive a digital pre-amplifier control setting through its wireless interface 230. Further in the embodiment, the wireless interface 230 may send the digital pre-amplifier control setting to multiplexer 416.

The multiplexer 416 within stage box 102 may separate the digital pre-amplifier control setting from the combined stream. The multiplexer 416 may send the digital pre-amplifier control setting to a pre-amplifier control 412.

In an embodiment, the pre-amplifier control 412 may function as a digital to analog (D2A) converter. Further in the embodiment, the pre-amplifier control 412 may convert the digital pre-amplifier control setting to analog pre-amplifier control setting.

The pre-amplifier control 412 may process the pre-amplifier control setting and use it to control a pre-amplifier 108 associated with an audio pickup device connected to the pre-amplifier 108.

Figure 5:
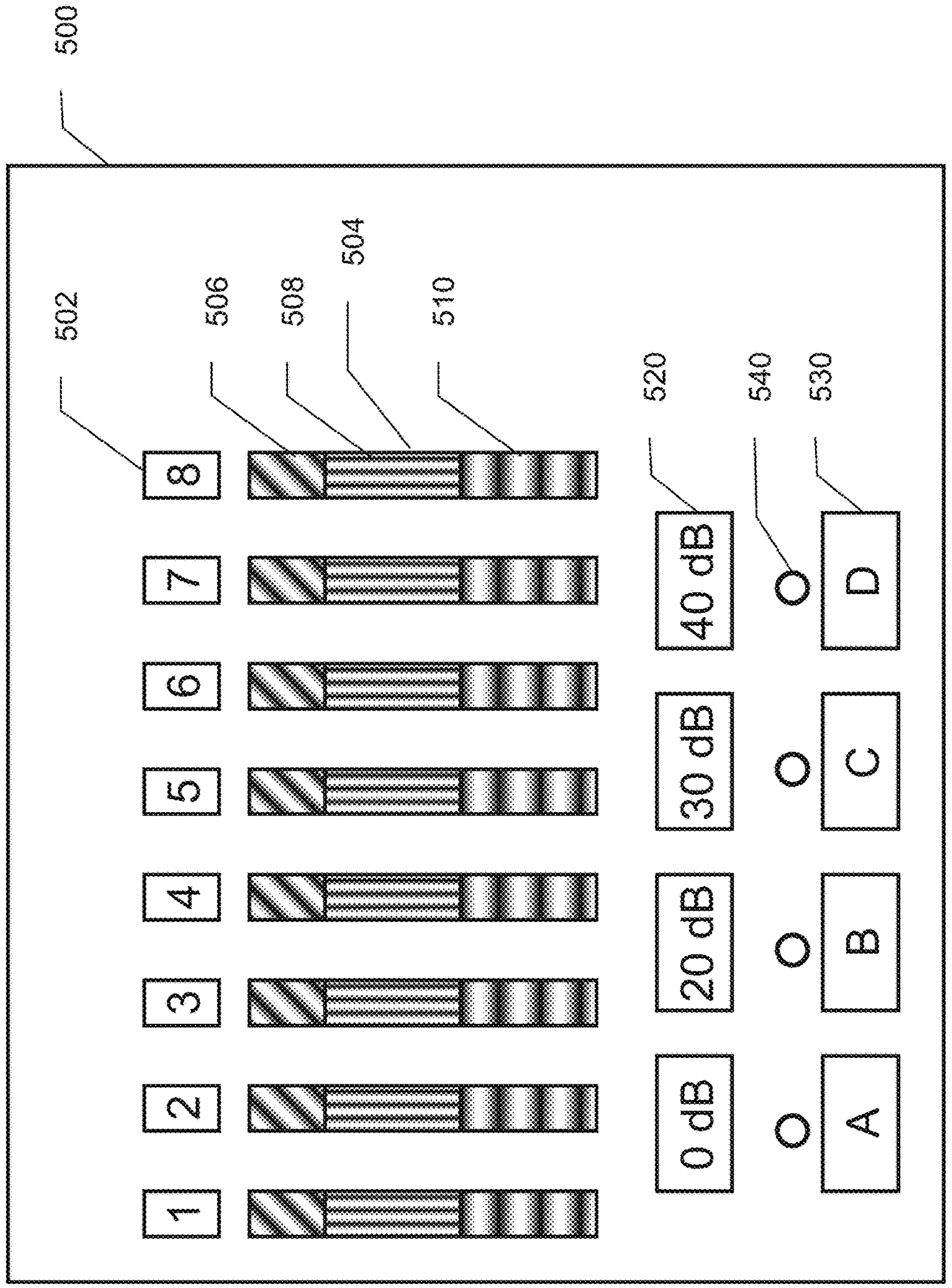
FIG. 5 depicts a variation of a virtual audio mixing board on a portable computing device that may be used to monitor and change audio settings of audio input devices connected to a stage box in accordance with an embodiment of the invention.

Referring to FIG. 5, the portable computing device 206 may comprise a means for channel monitoring and pre-amplifier control. A software program may be used to display a virtual audio mixing board 500 on the portable computing device 206. The present application may displace a traditional control panel. The portable computing device 206 may allow the user to wirelessly control and adjust audio and video settings from anywhere within an auditorium, stage, audience, and the like. Likewise, the portable computing device 206 may be operated off-site, allowing the user to not be present at the location where the system is physically located.

The virtual audio mixing board 500 may display an audio level meter 504 to represent each audio pickup device connected to a stage box 102. The audio level meter 504 may be represented by one of a bar graph, a pie chart, a digital readout, an analog readout such as a decibel meter, and the like. Each audio level meter 504 may be associated with a channel identifier 502 that denotes the input identifier for an audio pickup device. The input identifier may be one of a number, a character, and the like.

The virtual audio mixing board 500 may be used to display a pre-amplifier control setting such as gain setting control 520. A plurality of gain setting control 520 may be displayed to cover all the possible gain settings for a pre-amplifier control 412. The gain setting control 520 may be one of 0 dB, 20 dB, 30 dB, 40 dB and the like. When an audio level meter 504 is selected, the current gain setting for the pre-amplifier control 412 associated with the audio pickup device represented by that audio level meter 504 may be highlighted among the plurality of gain setting control 520 elements. The portable computing device 206 may transport a new gain setting represented by a highlighted gain setting control 520 to stage box 102 or base unit 104. The gain level control may allow a user to prevent the overdriving of the pre-amplifier 108 within stage box 102 and may allow for better dynamic range of the system.

The virtual audio mixing board 500 may display an audio level meter 504 for a subset, or bank, of all audio pickup devices present. This segmentation of audio pickup devices may be necessary for efficient and user-friendly display on a portable computing device 206. The virtual audio mixing board 500 may be used to display a bank selection control 530. A plurality of bank selection control 530 may be used to represent all the available subsets or banks of audio pickup devices present. The user may select a different bank of audio pickup devices for display my choosing the associated bank selection control 530. The virtual audio mixing board 500 may then display a plurality of audio level meter 504, channel identifier 502, and gain setting control 520 for the selected bank of audio pickup devices.

In an embodiment, the audio level meter 504 may comprise audio level segments 506, 508, and 510. The segments may be used to visually represent the scale of the audio level associated with an audio pickup device. In an embodiment, audio level segment 506 may be red, audio level segment 508 may be yellow, and audio level segment 510 may be green. The audio level for an audio pickup device may thus be graphically represented by illuminating a portion of each audio level segment 506, 508, and 510 as appropriate. For example, when an audio level reaches a level higher than the predefined upper limit of audio level 506, a portion of audio level 508 begins to be illuminated along with the entirety of audio level segment 506.

The virtual audio mixing board 500 may display an audio level warning indicator 540 for each bank or subset of audio pickup device available. An audio level warning indicator may be displayed above each bank selection control 530. When the audio level of any audio pickup device in a given bank reaches the maximum, or full-scale, level the associated audio level warning indicator 540 is illuminated. The audio level warning indicator 540 may allow a user to become aware of and to correct audio levels and pre-amplifier control settings of audio pickup devices that have reached full-scale level.

In an embodiment, a status indicator may be displayed on the virtual audio mixing board 500. The status indicator may be an indication of one of active stage box power, cable fault condition, no stage box connected, external reference lock, and the like.

In an embodiment, the portable computing device 206 may be used to control test signals sent to stage box 102. Operating levels of the stage box 102 may be set. In an example of an audio console based remote control, an operating level may be 20 dB below the maximum signal threshold; 10 dB may be the yellow line signal level marker, and the red line may be set at 99% of the full scale. In embodiments, the whole system may be set up with limits which may not cause distortion in normal operation. The compatibility may be tested, and the system may be reset for a given configuration. Remote control and test signal features of the present invention may provide convenient ways to set levels, determine frequency response, generate source of pink noise for acoustics, adjust sound system for acoustics, and the like.

Figure 6:
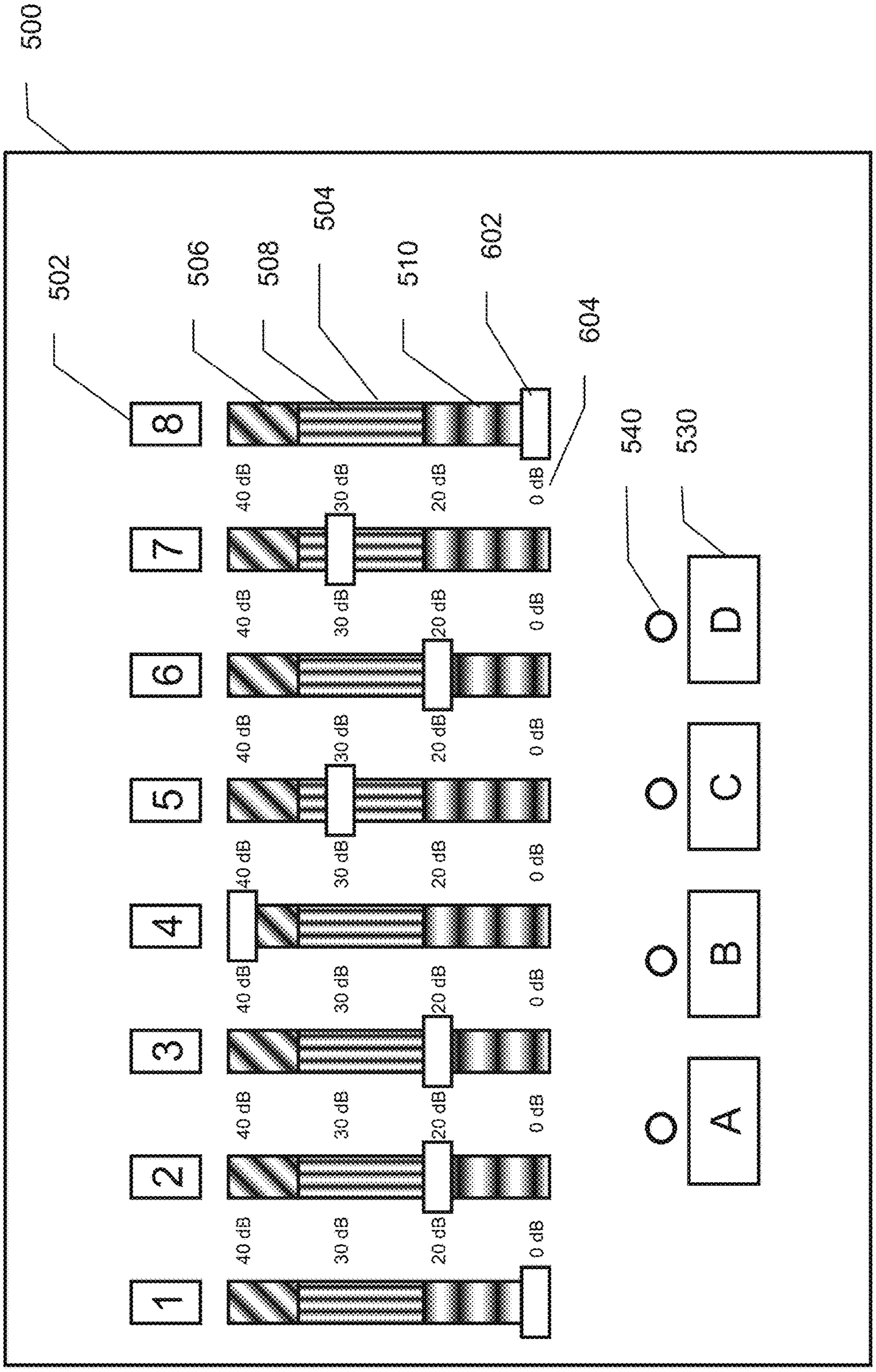
FIG. 6 depicts another variation of a virtual audio mixing board on a portable computing device that may be used to monitor and change audio settings of audio pickup devices connected to a stage box in accordance with an embodiment of the invention.

FIG. 6 depicts an alternative layout for the virtual audio mixing board 500. The virtual audio mixing board 500 may display an audio level meter 504 to represent each audio pickup device connected to a stage box 102. The audio level meter 504 may comprise a gain setting slider 602. The gain setting slider 602 may be positioned to show the current gain setting for an audio pickup device. An audio level legend 604 may be displayed to quantify both the gain setting slider 602 position and the current audio level in dB. A user may select the gain setting slider 602 and move it up or down to set a new gain setting to be applied to the audio pickup device.

Figure 7:
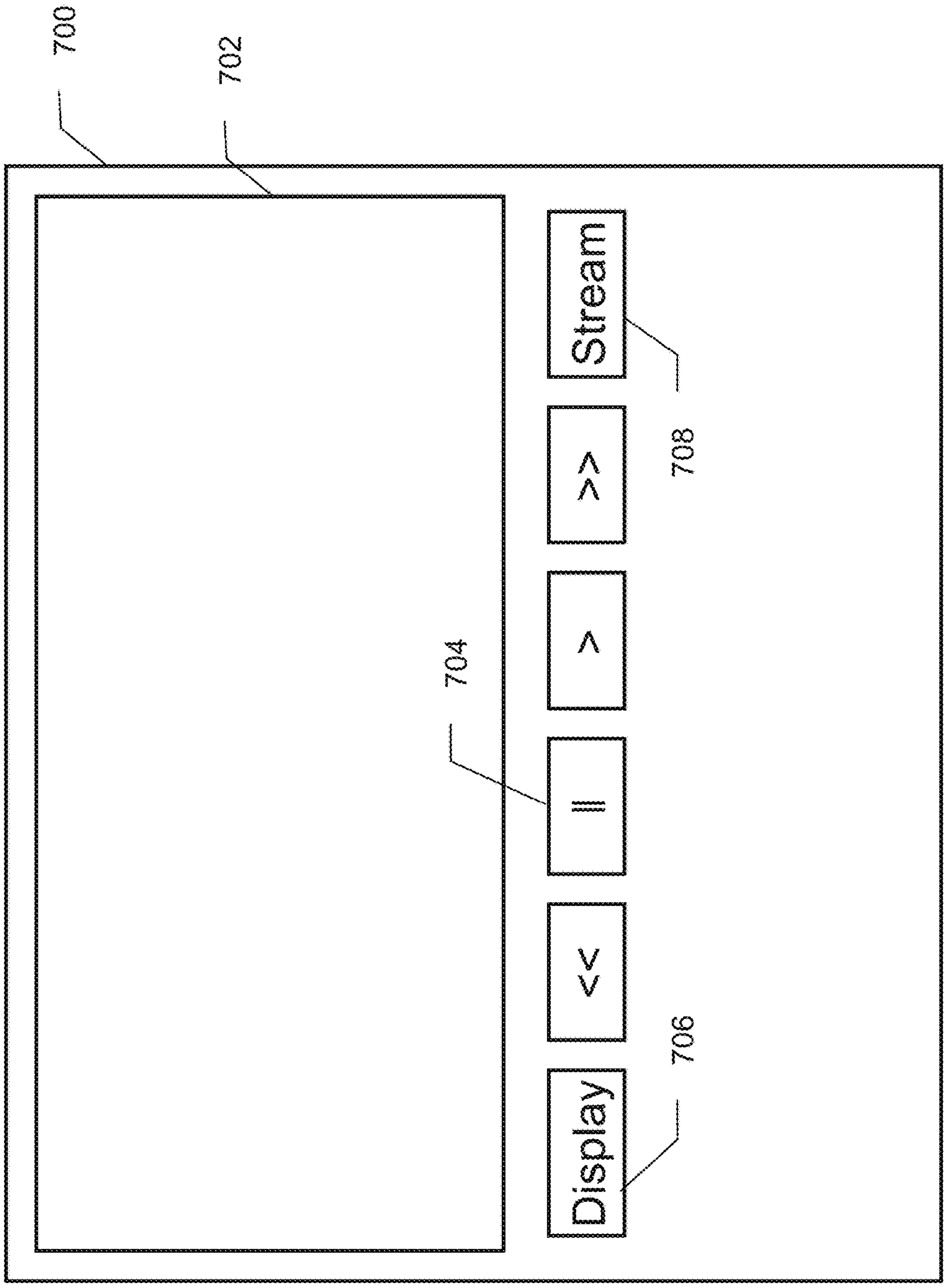
FIG. 7 depicts a monitoring screen on a portable computing device that may be used to monitor and manipulate a video capture device connected to a stage box or base unit in accordance with an embodiment of the invention.

In an embodiment, a user of the portable computing device 206 may select to monitor a video pickup device connected to a stage box 102. A video channel produced by the video pickup device may be transported from stage box 102 or base unit 104. Referring to FIG. 7, a monitoring screen 700 may comprise a video display screen 702. The video display screen 702 may display a video channel transported from a stage box 102 or a base unit 104 to portable computing device 206. The monitoring screen 700 may also comprise a set of video manipulation controls 704. The video manipulation controls 704 may include rewind, pause, stop, play, fast forward, restart, and the like.

The monitoring screen 700 may comprise a stream control 708. The stream control 708 may be highlighted or illuminated signifying that the video channel currently displayed on the video display screen 702 is being streamed to the internet through wireless network controller 208. The user may stop and start the video streaming by toggling the stream control 708.

The monitoring screen 700 may comprise a display control 706. The display control 706 may be highlighted or illuminated signifying that the video channel currently displayed on the video display screen 702 is also being displayed on a display screen positioned before the audience. The user may stop and start the display positioned before the audience by toggling the display control 706.

Figure 8:
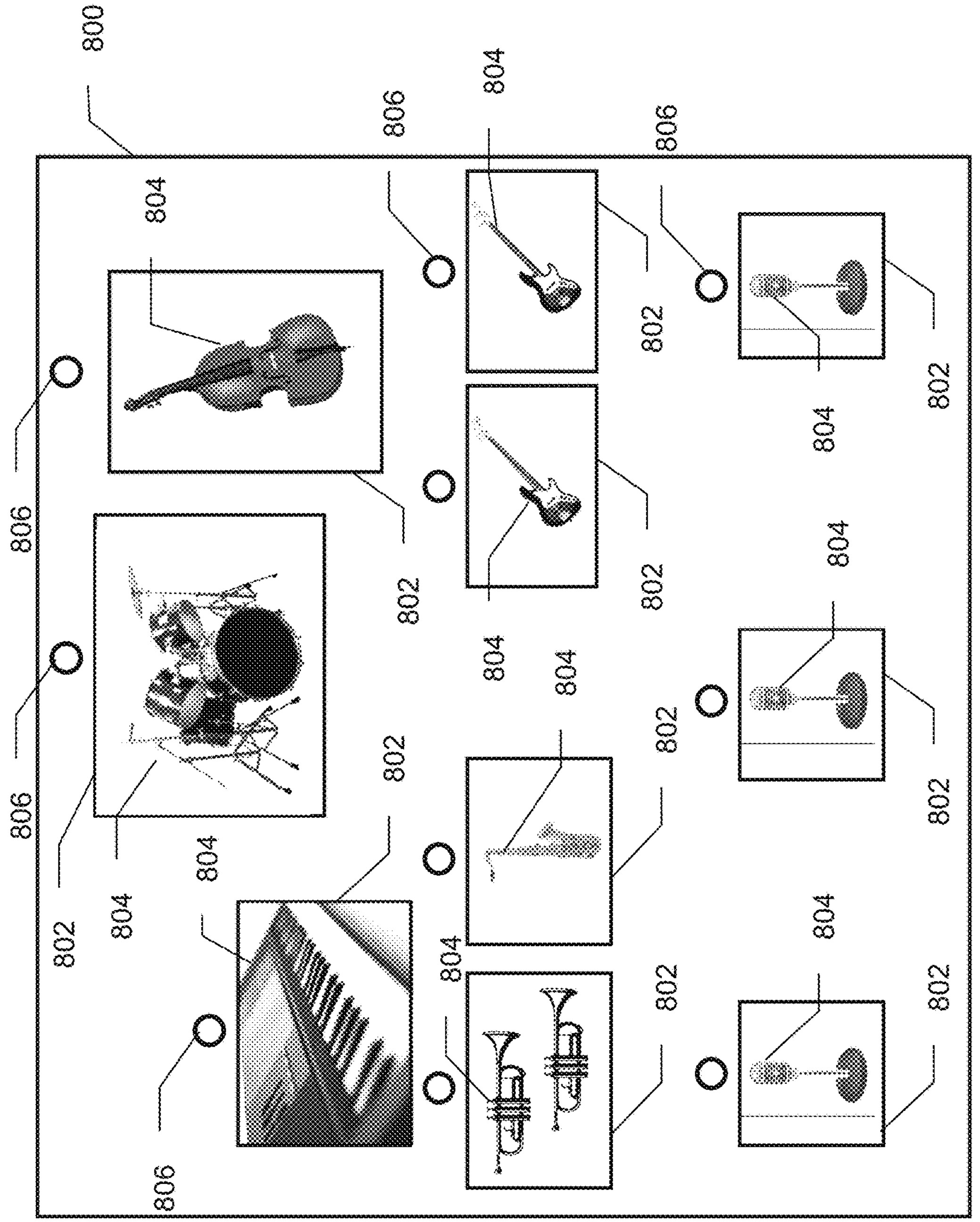
FIG. 8 depicts a menu screen embodied in a portable computing device that may be used to select a particular audio pickup device or bank of audio pickup devices to monitor and change settings of in accordance with an embodiment of the invention.

Referring to FIG. 8, the portable computing device 206 may provide a means for visually depicting the layout of audio and video pickup devices. A device selection screen 800 may display an audio pickup device selection control 802. The audio pickup device selection control 802 may be displayed in a manner that mimics the physical location of the pickup device producing the audio signal in relation to other pickup devices and the physical stage layout. The user may select to monitor the settings of an audio pickup device by selecting the corresponding pickup device selection control 802.

The pickup device selection control 802 may comprise an audio pickup device identifier 804. The pickup device identifier 804 may identify the type of pickup device that is producing the input channel. The pickup device identifier may be one of text, graphic, and the like.

In an embodiment, an audio level warning indicator 806 may be displayed for an audio pickup device selection control 802. The audio level warning indicator 806 may allow a user to become aware of and to correct audio levels and gain settings of pickup devices that have reached full-scale level. In another embodiment, an audio pickup device selection identifier 804 may change its appearance when an input channel has reached full-scale level. The change in appearance may be one of highlighting, blinking, illuminating, changing color, changing border color, and the like.

Figure 9:
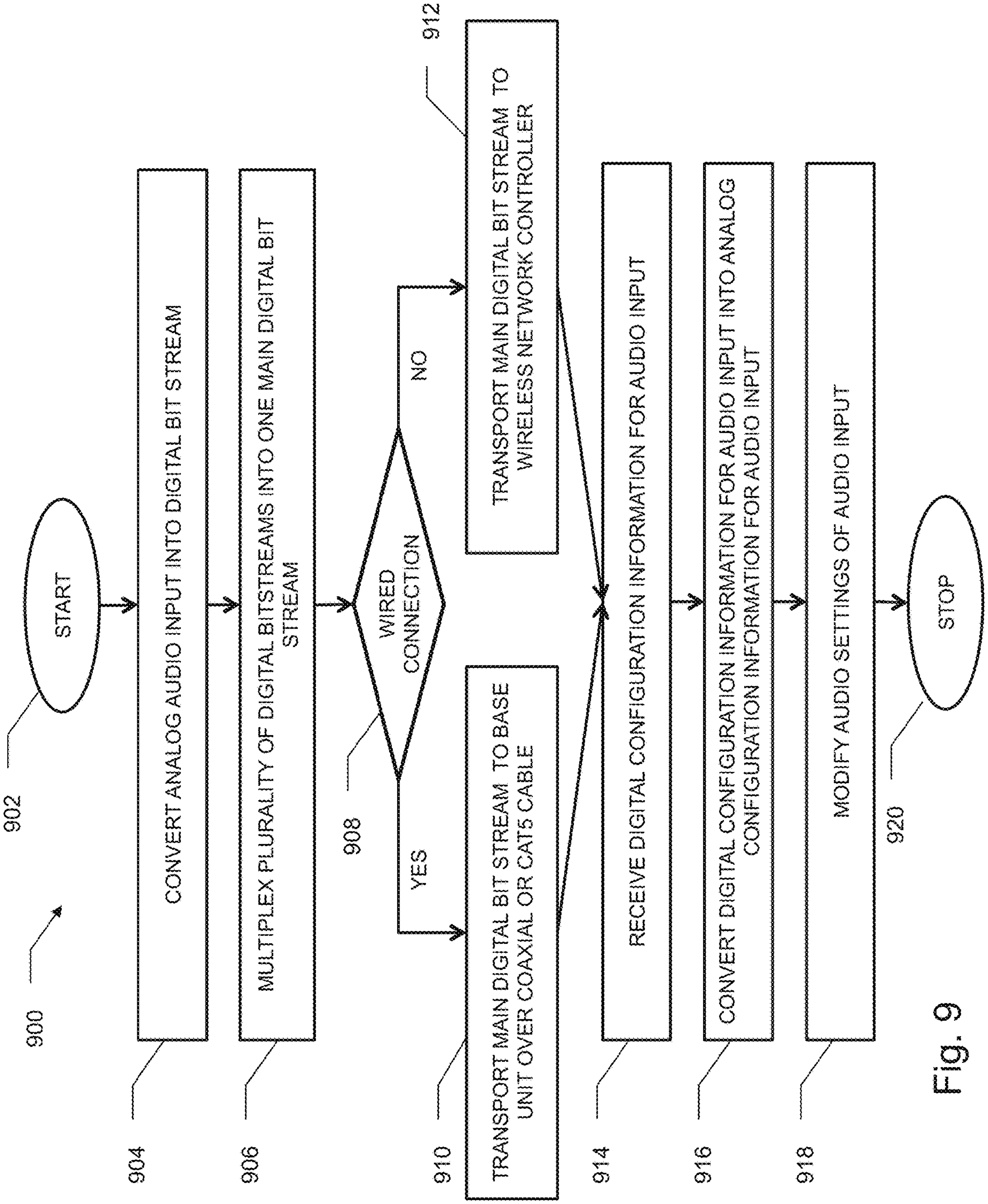
FIG. 9 depicts a flow diagram of the functions performed by a stage box in accordance with an embodiment of the invention.

FIG. 9 represents a flow diagram showing exemplary functionality of a stage box 102 when used in conjunction with an analog audio pickup device, such as a microphone 120. The process 900 initiates at step 902. When an audio pickup device is present, it may produce an audio signal which may be converted to a digital audio stream at step 904. A plurality of audio pickup device may be present, and each may produce an audio signal that may be converted to a digital data stream at step 904. The resulting plurality of digital audio streams produced by step 904 may be multiplexed into one main digital audio stream at step 906.

At step 908, stage box 102 may determine whether it is connected via a wired or wireless connection. If a wired connection is in use, the main digital data stream may be transported to a base unit 104 via a cable connection at step 910. If a wireless connection is in use, the main digital data stream may be transported to a wireless network controller 208 via a wireless connection at step 912.

A control panel, such as an analog control panel, a digital control panel, a portable computing device, and the like, may be used to modify a pre-amplifier control setting. A pre-amplifier control setting may be one of gain setting, volume, phase, frequency, power supply voltage, and the like. The modified pre-amplifier control setting may be sent to a stage box 102. The modified pre-amplifier control setting may be received at step 914. The stage box 102 may convert the digital pre-amplifier control setting to analog at step 916. The analog pre-amplifier control setting may be used to modify the audio setting of a pre-amplifier associated with an audio pickup device at step 918. The process 900 concludes at step 920.

Figure 10:
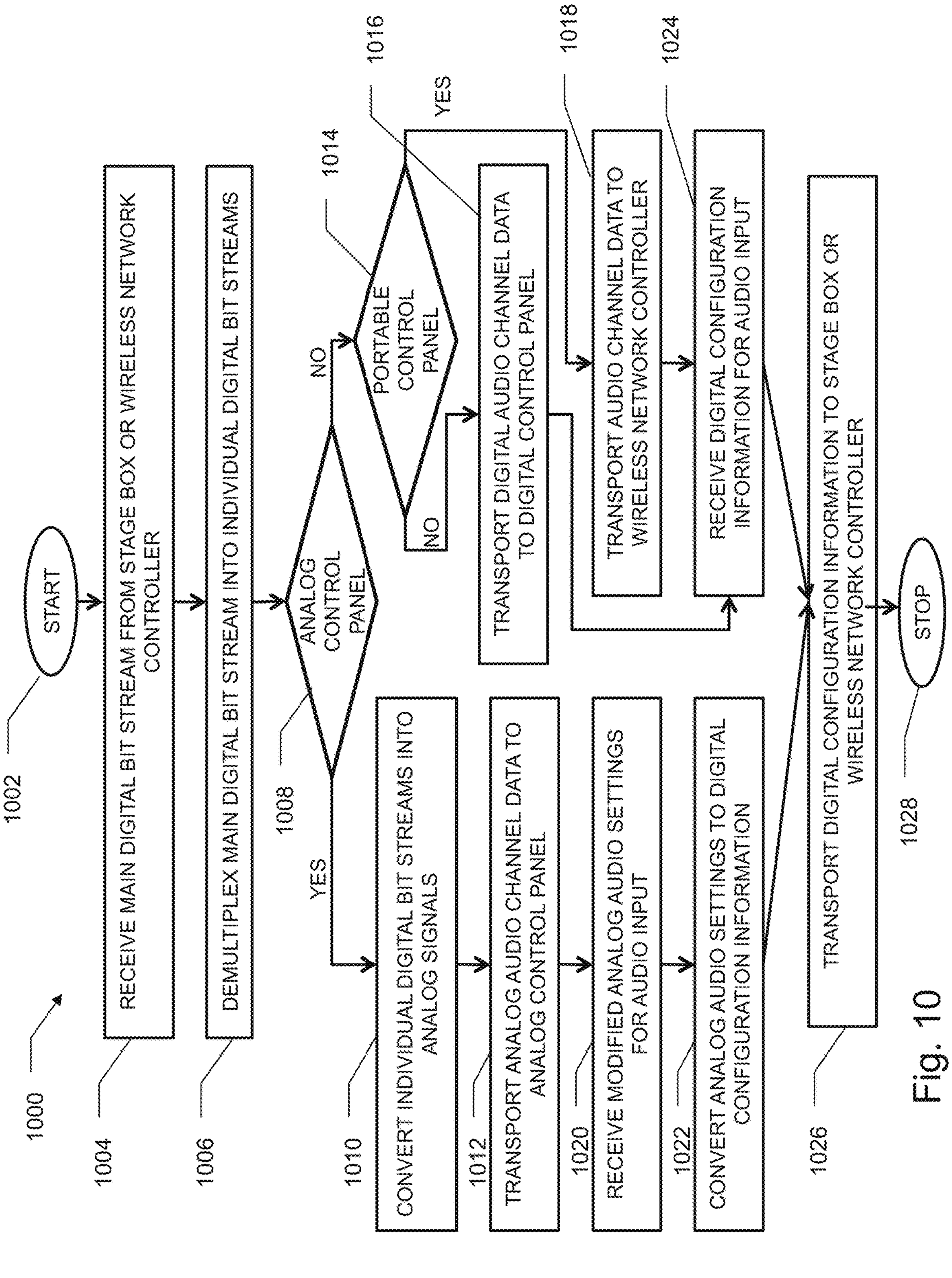
FIG. 10 depicts a flow diagram of the functions performed by a base unit in accordance with an embodiment of the invention.

FIG. 10 represents a flow diagram showing exemplary functionality of a base unit 104 when used in conjunction with a control panel. The process 1000 initiates at step 1002. At step 1004, a digital data stream may be received from a cable connection to a stage box 102, a wireless connection to a wireless network controller 208, and the like. The main digital data stream may be de-multiplexed into a plurality of individual digital data streams at step 1006.

At step 1008, main unit 104 may determine that it is being used in conjunction with an analog control panel. The digital data stream may be converted into an analog signal at step 1010 and transported as analog audio signal data to an analog control panel at step 1012.

Alternatively, at step 1008, main unit 104 may determine that it is being used in conjunction with a digital control panel. At step 1014, main unit 104 may determine whether it is being used in conjunction with a portable computing device. If the main unit 104 is being used with a traditional control panel, the digital data stream may be transported as digital audio signal data to a digital control panel at step 1016. If base unit 104 is being used in conjunction with a portable computing device, the digital data stream may be transported as digital audio signal data to a wireless network controller 208 at step 1018.

A control panel, such as an analog control panel, a digital control panel, a portable computing device, and the like, may be used to modify a pre-amplifier control setting. A pre-amplifier control setting may be one of gain setting, volume, phase, frequency, synchronization, power supply voltage, and the like.

An analog control panel may send a modified analog pre-amplifier control setting to base unit 104. The analog pre-amplifier control setting may be received at step 1020 and may be converted to a digital pre-amplifier control setting at step 1022. A digital control panel may also modify a pre-amplifier control setting and may send the modified information to base unit 104 in digital form. The digital pre-amplifier control setting may be received at step 1024.

The base unit 104 may send the digital pre-amplifier control setting to a stage box 102 at step 1026. The base unit 104 may send the digital pre-amplifier control setting to a wireless network controller 208 at step 1026 if base unit 104 is being used in conjunction with a wireless connection. The process 1000 concludes at step 1028.

Figure 11:
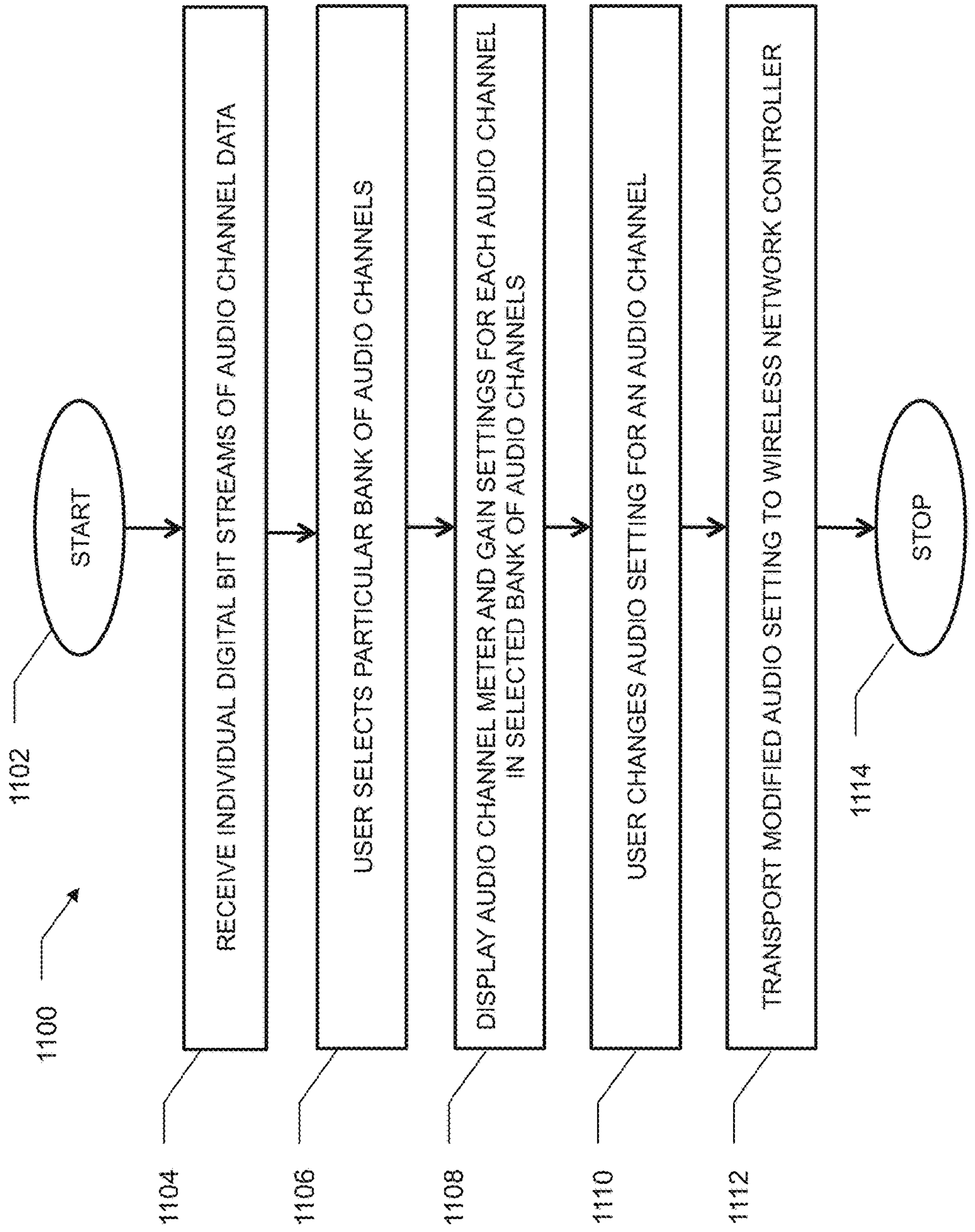
FIG. 11 depicts a flow diagram of the functions performed by a portable computing device in accordance with an embodiment of the invention.

FIG. 11 represents a flow diagram showing exemplary functionality of a portable computing device 206. The process 1100 starts at step 1102. A portable computing device 206 may receive individual digital data streams that represent audio signal data produced by a plurality of audio pickup devices at step 1104. A plurality of audio signals may be present, making display of all audio signal information inconvenient or impossible. A plurality of audio signals may be broken into a set of banks or sections. A user may select a bank of audio signals from a menu screen displayed on the portable computing device 206 at step 1106. The portable computing device may display data associated with audio signals in the selected bank at step 1108. The data associated with an audio signal may be one of audio signal meter, gain setting, phase setting, frequency range, and the like. A user may be allowed to manipulate a pre-amplifier control setting for an audio signal at step 1110. The portable computing device 206 may transmit the modified pre-amplifier control setting to wireless network controller 208 at step 1112. Wireless network controller 208 may transport the pre-amplifier control setting to a base unit 104 or a stage box 102 for application. The process 1100 concludes at step 1114.

Figure 12:
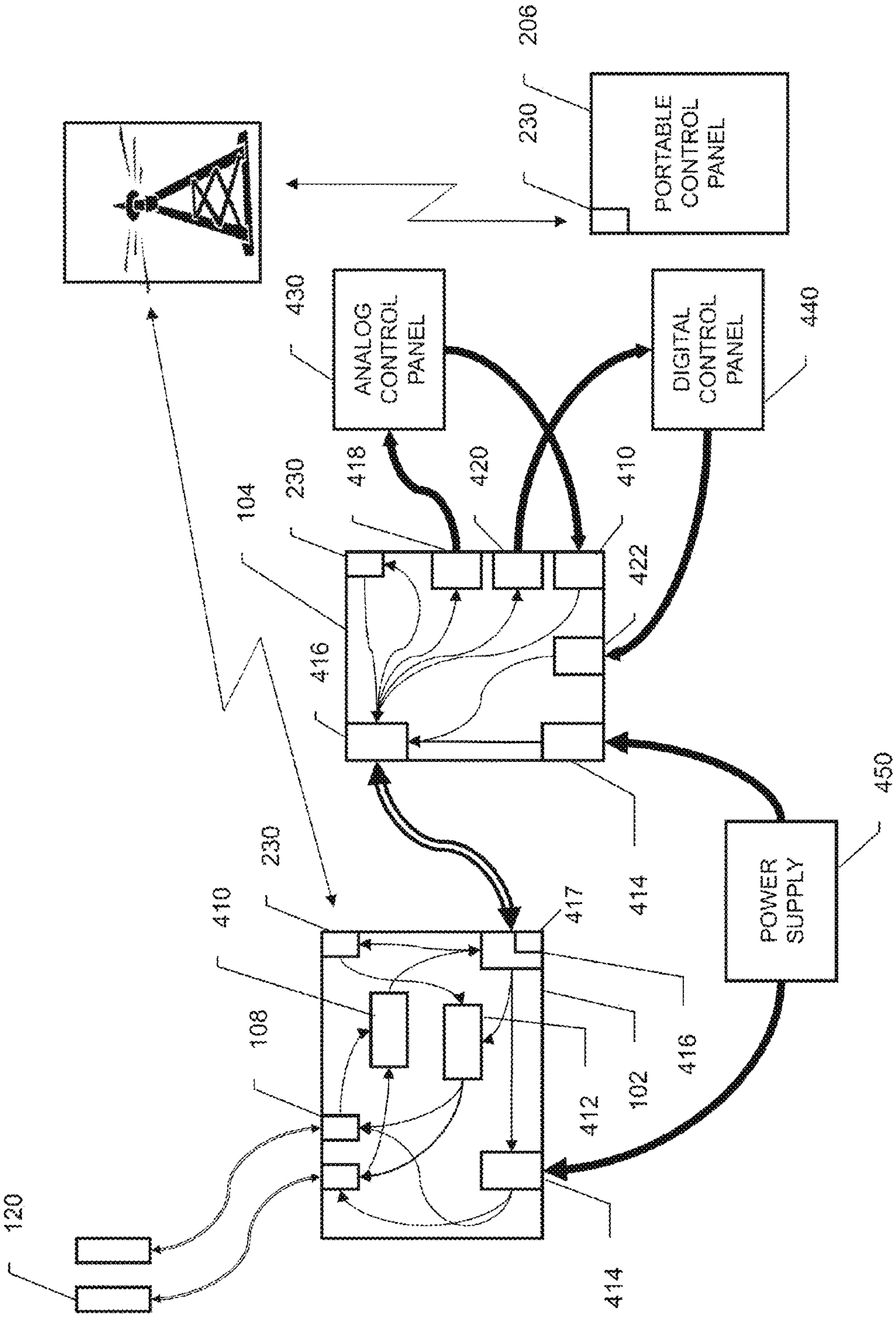
FIG. 12 depicts an exemplary and non-limiting embodiment of the internal communication between a stage box, a base unit and various control panels.

FIG. 12 depicts an exemplary and non-limiting embodiment of the internal communication between a stage box, a base unit and various control panels with audio-quality improving multiplexed digital signal processor 417 forming a part of multiplexer 416 as described above.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system comprising:

at least one video pickup device; and a plurality of stage boxes interconnected in a daisy-chain with at least one base unit, wherein a first stage box of the daisy-chain:

receives a video signal from the at least one video pickup device, receives a multiplexed video signal from a second stage box in the daisy-chain;

multiplexes the video signal with the multiplexed video signal producing a combined multiplexed video signal; and transmits the combined multiplexed video signal over the daisy-chain to the at least one base unit;

wherein the at least one base unit:

demultiplexes the combined multiplexed video signal into a plurality of video signals; and powers the plurality of stage boxes via a power signal over the daisy-chain that is physically distinct from the combined multiplexed video signal.

2. The system of claim 1, wherein the daisy-chain comprises a twisted-pair cable configuration.

3. The system of claim 1, wherein the daisy-chain comprises a co-axial cable configuration.

4. The system of claim 1, wherein the daisy-chain comprises a tri-axial cable configuration.

5. The system of claim 1, wherein the video signal includes an audio portion and the at least one base unit is further configured to transmit an audio pre-amplifier control setting from the at least one base unit to at least one of the plurality of stage boxes over the daisy-chain.

6. The system of claim 5, wherein the audio pre-amplifier control setting is a digital command for instructing a processor to control an audio pre-amplifier control feature of the at least one of the plurality of stage boxes.

7. The system of claim 6, wherein the processor and the audio pre-amplifier control feature are embodied within the at least one of the plurality of stage boxes.

8. A method, comprising:

interconnecting a plurality of stage boxes and a base unit in a daisy-chain;

receiving, at a first stage box of the plurality, a video signal from a media pickup device;

receiving, at the first stage box, a multiplexed video signal from a second stage box of the plurality;

multiplexing the video signal with the multiplexed video signal thereby producing a combined multiplexed video signal;

transmitting the combined multiplexed video signal over the daisy-chain to the base unit;

demultiplexing the combined multiplexed video signal at the base unit into a plurality of video signals; and powering the plurality of stage boxes by transmitting power from the base unit through the daisy-chain.

9. The method of claim 8, wherein the daisy-chain comprises a twisted-pair cable configuration.

10. The method of claim 8, wherein the daisy-chain comprises a co-axial cable configuration.

11. The method of claim 8, wherein the daisy-chain comprises a tri-axial cable configuration.

12. The method of claim 8, further including transmitting a pre-amplifier control setting for an audio portion of the video signal from a media pickup device from the base unit to at least one of the plurality of stage boxes over the daisy chain.

13. The method of claim 12, wherein the pre-amplifier control setting is a digital command for instructing a processor to control a pre-amplifier control feature of the at least one of the plurality of stage boxes.

14. The method of claim 13, wherein the processor and the pre-amplifier control feature are embodied within the at least one of the plurality of stage boxes.

* * * * *